(12) United States Patent
Farmer et al.

(10) Patent No.: US 9,643,113 B2
(45) Date of Patent: May 9, 2017

(54) DRAIN COVER

(71) Applicant: Hussmann Corporation, Bridgeton, MO (US)

(72) Inventors: Nathaniel A. Farmer, Creve Coeur, MO (US); Jason C. Lintker, St. Louis, MO (US); John F. Parker, O'Fallon, MO (US); Thomas C. Wind, Wildwood, MO (US)

(73) Assignee: Hussmann Corporation, Bridgeton, MO (US)

( * ) Notice: Subject to any disclaimer, the term of this patent is extended or adjusted under 35 U.S.C. 154(b) by 112 days.

(21) Appl. No.: 14/621,503

(22) Filed: Feb. 13, 2015

(65) Prior Publication Data

US 2015/0233628 A1    Aug. 20, 2015

Related U.S. Application Data

(60) Provisional application No. 61/940,217, filed on Feb. 14, 2014.

(51) Int. Cl.
| *E03C 1/264* | (2006.01) |
| *B01D 35/02* | (2006.01) |
| *E03F 5/06* | (2006.01) |
| *A47F 3/04* | (2006.01) |

(52) U.S. Cl.
CPC ............ *B01D 35/02* (2013.01); *A47F 3/0482* (2013.01); *E03C 1/264* (2013.01); *E03F 5/06* (2013.01)

(58) Field of Classification Search
CPC .. E03F 5/04; E03F 5/0407; E03F 5/06; B01D 35/02; A47F 3/04; A47F 3/0482; E03C 1/264; E04D 13/0409; E04H 4/1236

USPC ............. 210/163, 166; 4/292, 490, 507; 52/302.1; 62/318, 319; 108/24

See application file for complete search history.

(56) References Cited

U.S. PATENT DOCUMENTS

| 1,791,512 | A | * | 2/1931 | Schurman | ........... E04D 13/0409 210/163 |
| 2,689,017 | A | * | 9/1954 | Schmid | ............... E04D 13/0409 210/166 |
| 3,402,407 | A | | 9/1968 | Andrews | |
| 3,788,485 | A | * | 1/1974 | Bruning | .................. E03C 1/264 4/292 |
| 3,978,632 | A | * | 9/1976 | Ansted | ................... A47F 3/0482 52/309.2 |
| 4,230,346 | A | | 10/1980 | Gobel | |
| 5,130,016 | A | * | 7/1992 | Gavin | ....................... E03F 5/06 210/164 |
| 5,394,657 | A | | 3/1995 | Peterson | |
| 5,409,602 | A | * | 4/1995 | Sorenson | ............... B01D 35/02 210/163 |
| 5,486,287 | A | | 1/1996 | Murphy et al. | |
| 5,535,554 | A | * | 7/1996 | Harris, Jr. | ........... E04D 13/0409 210/474 |

(Continued)

*Primary Examiner* — Christopher Upton
(74) *Attorney, Agent, or Firm* — Michael Best & Friedrich LLP

(57) ABSTRACT

A drain cover includes a base portion including an outer rim and defining a collection area. The drain cover also includes a central portion coupled to the base portion and extending upward from the base portion, wherein the collection area tapers from the central portion toward the outer rim, and wherein the collection area is vertically lower adjacent the central portion relative to an outer periphery of the collection area.

19 Claims, 5 Drawing Sheets

(56) References Cited

U.S. PATENT DOCUMENTS

| | | | |
|---|---|---|---|
| 5,862,535 A * | 1/1999 | Noga | E03C 1/264 |
| | | | 4/292 |
| 6,088,844 A | 7/2000 | Killham | |
| 6,141,916 A | 11/2000 | Shackelford | |
| 6,165,357 A | 12/2000 | Cormier | |
| 6,397,408 B1 | 6/2002 | Veloskey et al. | |
| 6,428,693 B2 | 8/2002 | Singleton | |
| 6,442,774 B2 | 9/2002 | Wilson et al. | |
| 6,615,417 B1 | 9/2003 | Newhard | |
| 6,953,208 B2 | 10/2005 | Warnecke | |
| 7,005,061 B1 * | 2/2006 | Downs | E03F 5/0404 |
| | | | 210/163 |
| 7,237,398 B2 | 7/2007 | Duffy | |
| 7,704,386 B2 | 4/2010 | Ventura | |
| 8,281,427 B2 | 10/2012 | Afshar | |
| 2001/0042267 A1 | 11/2001 | Wilson et al. | |
| 2005/0247612 A1 | 11/2005 | Glassheim | |
| 2007/0180604 A1 | 8/2007 | Griffin et al. | |
| 2007/0180605 A1 * | 8/2007 | Griffin | E04H 4/1236 |
| | | | 4/507 |
| 2008/0307573 A1 * | 12/2008 | Ho | E03C 1/264 |
| | | | 4/292 |
| 2009/0049594 A1 * | 2/2009 | Landsberger | E03C 1/264 |
| | | | 4/292 |
| 2013/0152298 A1 | 6/2013 | Lyristakis | |
| 2013/0191982 A1 | 8/2013 | Booker, Jr. | |
| 2013/0240424 A1 | 9/2013 | Worth et al. | |
| 2013/0330127 A1 | 12/2013 | DeLoach et al. | |

* cited by examiner

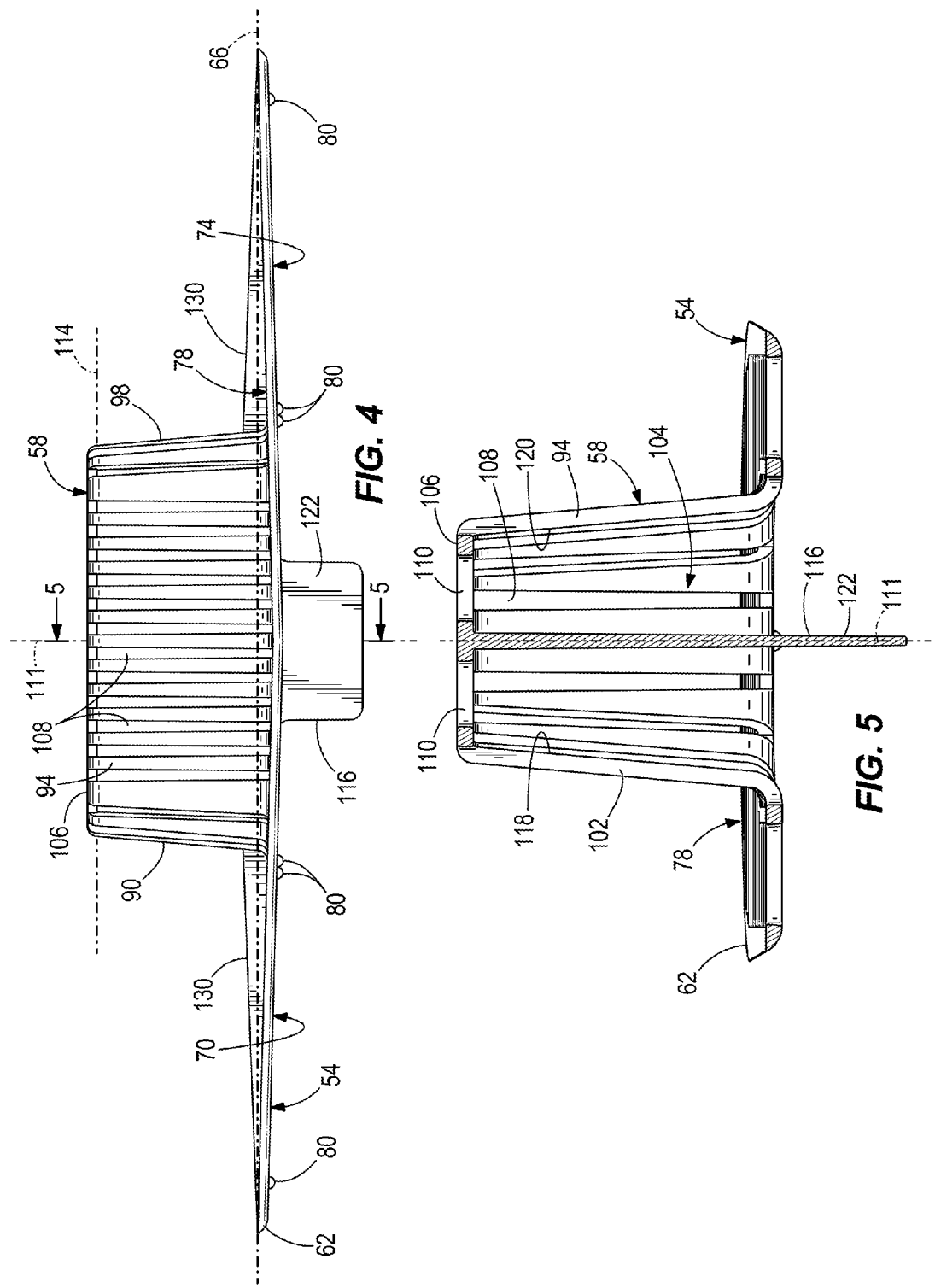

DRAIN COVER

CROSS-REFERENCE TO RELATED APPLICATIONS

This application claims priority to U.S. Provisional Application No. 61/940,217, filed Feb. 14, 2014, the entire contents of which are incorporated herein by reference.

BACKGROUND

The present invention relates to a drain cover, and more particularly to a drain cover for use in a refrigerated merchandiser.

Refrigerated merchandisers generally include a case that defines a product display area for supporting and displaying food products. Refrigerated merchandisers also include one or more drainage areas, generally along a bottom of the product display area. The drainage areas allow water, which has accumulated at the bottom of the product display area, to pass out of the product display area. The drainage areas often become clogged, however, due to debris (e.g., food, etc.) that can accumulate in the drainage area.

SUMMARY

In one construction, the invention provides a drain cover that includes a base portion including an outer rim and defining a collection area. The drain cover also includes a central portion coupled to the base portion and extending upward from the base portion, wherein the collection area tapers from the central portion toward the outer rim, and wherein the collection area is vertically lower adjacent the central portion relative to an outer periphery of the collection area.

In another construction, the invention provides a drain cover that includes a base portion defining a collection area, and a central portion coupled to the base portion and extending upward from the base portion. The central portion includes a projection extending below a lowermost part of the base portion, the projection configured to engage a drain hole to limit rotation of the drain cover relative to the drain hole. The collection area is oriented to direct water and debris toward the central portion.

In another construction, the invention provides a merchandiser that includes a base supporting a product display area and including a drain hole. The merchandiser also includes a drain cover coupled to the base over the drain hole. The drain cover includes a raised central portion and defining a collection area adjacent the central portion. The drain cover is spaced from a surface of the base by a spacer such that water can flow from the collection area through the drain cover and along the surface toward the drain hole.

Other aspects of the invention will become apparent by consideration of the detailed description and accompanying drawings.

BRIEF DESCRIPTION OF THE DRAWINGS

FIG. 4 is a side view of the drain cover.

FIG. 5 is a cross-sectional view of the drain cover, taken along lines 5-5 in FIG. 4.

Before any constructions of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

DETAILED DESCRIPTION

Figure 1:
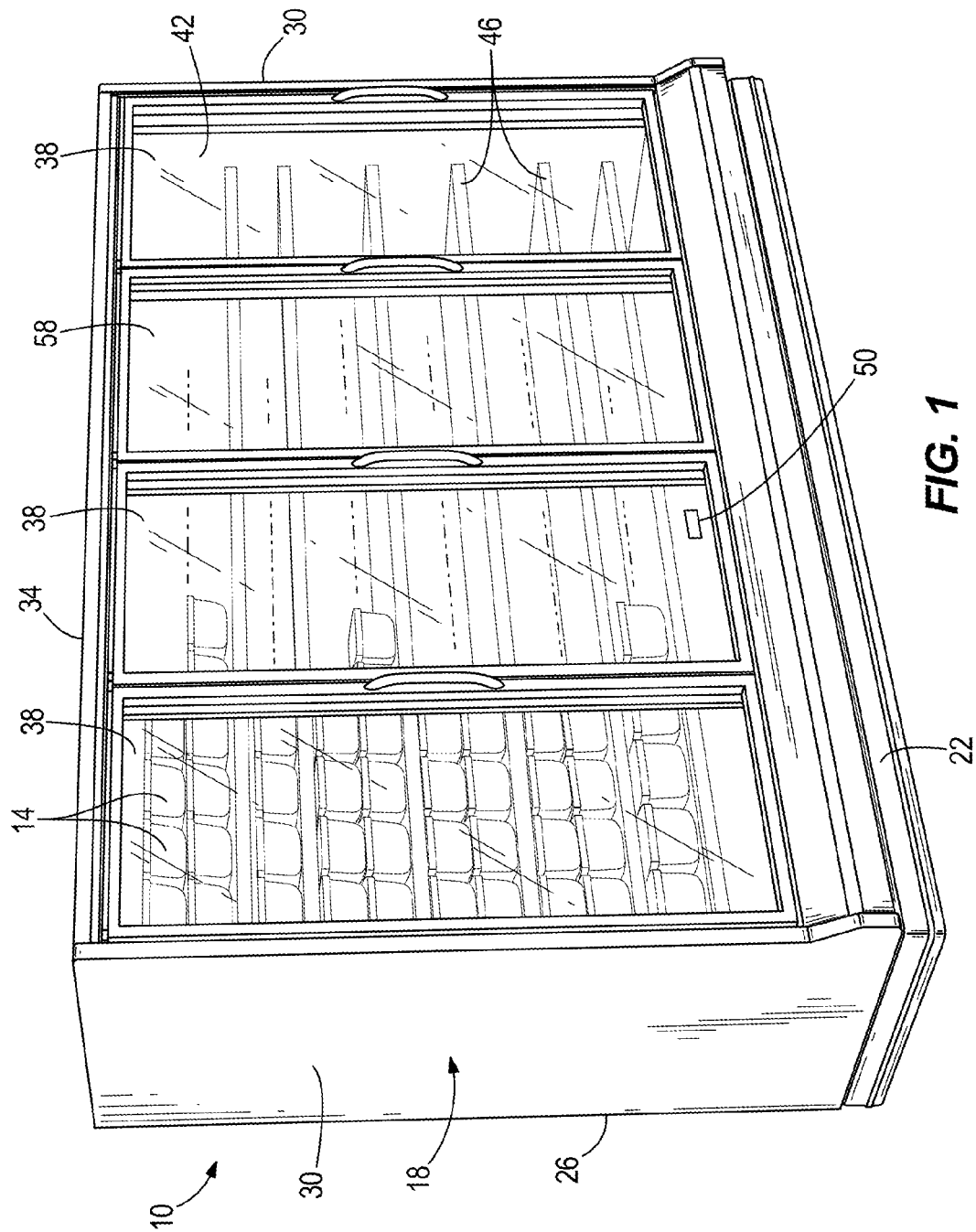
FIG. 1 is a front perspective view of a refrigerated merchandiser.

FIG. 1 shows a merchandiser 10 that may be located in a supermarket or a convenience store (not shown) for presenting fresh food, beverages, and other food product 14 to consumers. The illustrated merchandiser 10 is an upright merchandiser, although other types of merchandisers (e.g., horizontal merchandisers, etc.) fall within the scope of the invention. The merchandiser 10 includes a case 18 that has a base 22, a rear wall 26, side walls 30, a canopy 34, and a plurality of doors 38. The doors 38 are supported by the case 18, and permit access to the food product 14. The area partially enclosed by the base 22, rear wall 26, side walls 30, and the canopy 34 defines a product display area 42 supported by the base 22. The product display area 42 supports the food product 14 in the case 18. The food product 14 is displayed on racks or shelves 46 extending forwardly from the rear wall 26, and is accessible by consumers through the doors 38 adjacent the front of the case 18. As shown in FIG. 1, the food product 14 and the shelves 46 are visible behind the substantially transparent doors 38. Other embodiments of the merchandiser 10 can be provided without doors. The merchandiser 10 can be a refrigerated or a non-refrigerated merchandiser.

With reference to FIGS. 1-6, the merchandiser 10 also includes a drain cover 50 (illustrated schematically in FIG. 1) that is positioned in a drainage location in the base 22. The drain cover 50 is coupled to the base 22. Although the drain cover 50 is described and illustrated in detail with regard to use in the merchandiser 10, it will be appreciated that the drain cover 50 may be used in any drainage setting within a merchandiser or any other structure that benefits from drainage control.

With reference to FIGS. 2-6, the drain cover 50 includes a lower or base portion 54 and a central portion 58. As illustrated, the base portion 54 has an outer rim 62 that defines a substantially oval-shaped profile for the base portion 54 when viewed from above or below, although the base portion 54 can have other rim profiles. Some or all of the base portion 54 rests on a surface (e.g., a surface of base 22), while any remaining part of the base portion 54 and the central portion 58 are positioned over a drain hole to allow passage of water and debris through the drain cover 50 and into the drain hole.

With reference to FIGS. 2-6, the base portion 54 is elongated along a horizontal plane 66 (referred to as the "plane" 66 for purposes of description only) extending through opposite sides of the outer rim 62. As will be appreciated, a horizontal axis extending in the elongated direction and through a center of the cover 50 the forms part of the plane 66.

Figure 3:
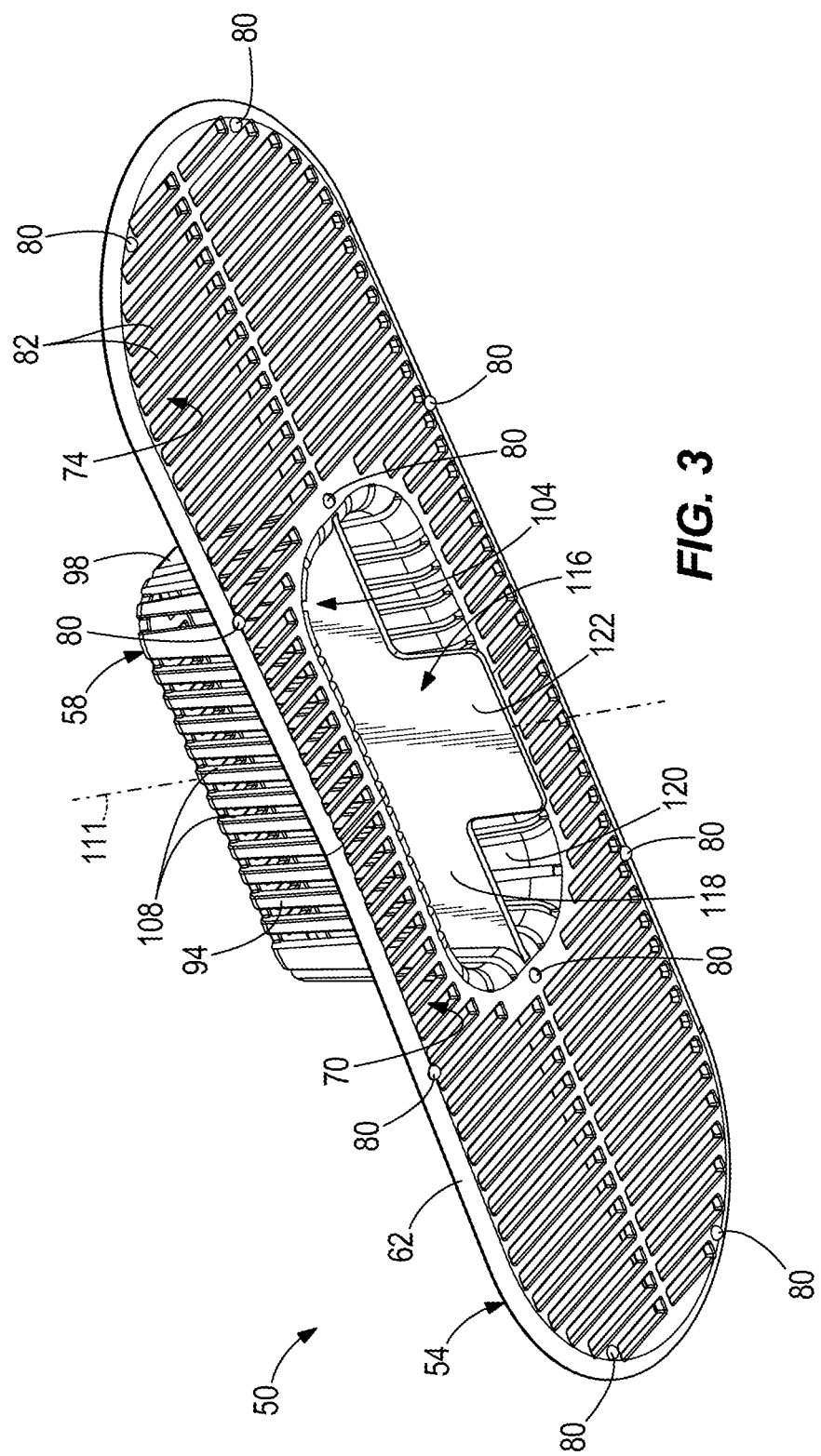
FIG. 3 is a bottom perspective view of the drain cover.
Figure 6:
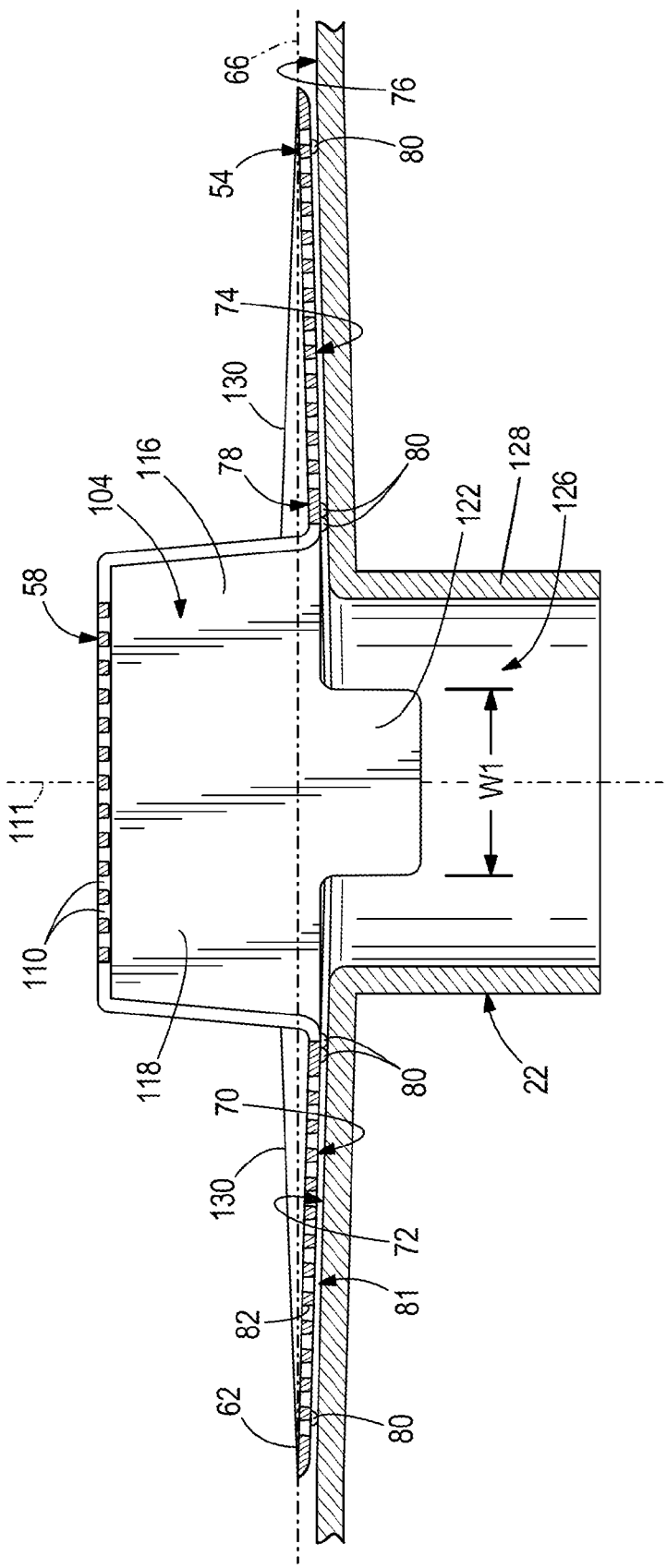
FIG. 6 is a cross-sectional view of the drain cover, taken along lines 6-6 in FIG. 2, positioned over a drain opening in a base of the refrigerated merchandiser.

As illustrated in FIGS. 3, 4, and 6, the base portion 54 includes a first, lower surface 70 that is oriented to face a corresponding surface 72 of the base 22, and a second, lower surface 74 on the other side of the base portion 54 that is oriented to face another surface 76 of the base 22. The surfaces 70, 72, 74, 76 are angled downward relative to the plane 66 from the outer rim 62 toward the central portion 58. That is, the distance between the plane 66 and the base portion 54 increases from the outer rim 62 toward the central portion 58 such that the base portion 54 defines a collection area 78 (e.g., for water, debris, etc.). The collection area 78 tapers from the central portion 58 toward the outer rim 62. The downwardly angled or tapered collection area 78 directs water naturally (e.g., via gravity) toward the central portion 58. The collection area 78 is vertically lower adjacent the central portion 58 relative to an outer periphery of the collection area 78.

As illustrated in FIG. 6, the surfaces 70, 74 of the base portion 54 generally follow the profiles of the surfaces 72, 76 of the base 22 (e.g., are parallel to the surfaces 72, 76). The base portion 54 is spaced from the base 22 by projections or spacers 80 that are coupled to and extend below the surfaces 70, 74 of the base portion 54. The projections 80 define a gap 81 (see FIG. 6) between the surfaces 70, 74 of the base portion 54 and the surfaces 72, 76 of the base 22. Water can flow from the collection area 78 through the drain cover 50 and along the surfaces 72, 76 within this gap 81 toward a drain hole 126.

Figure 2:
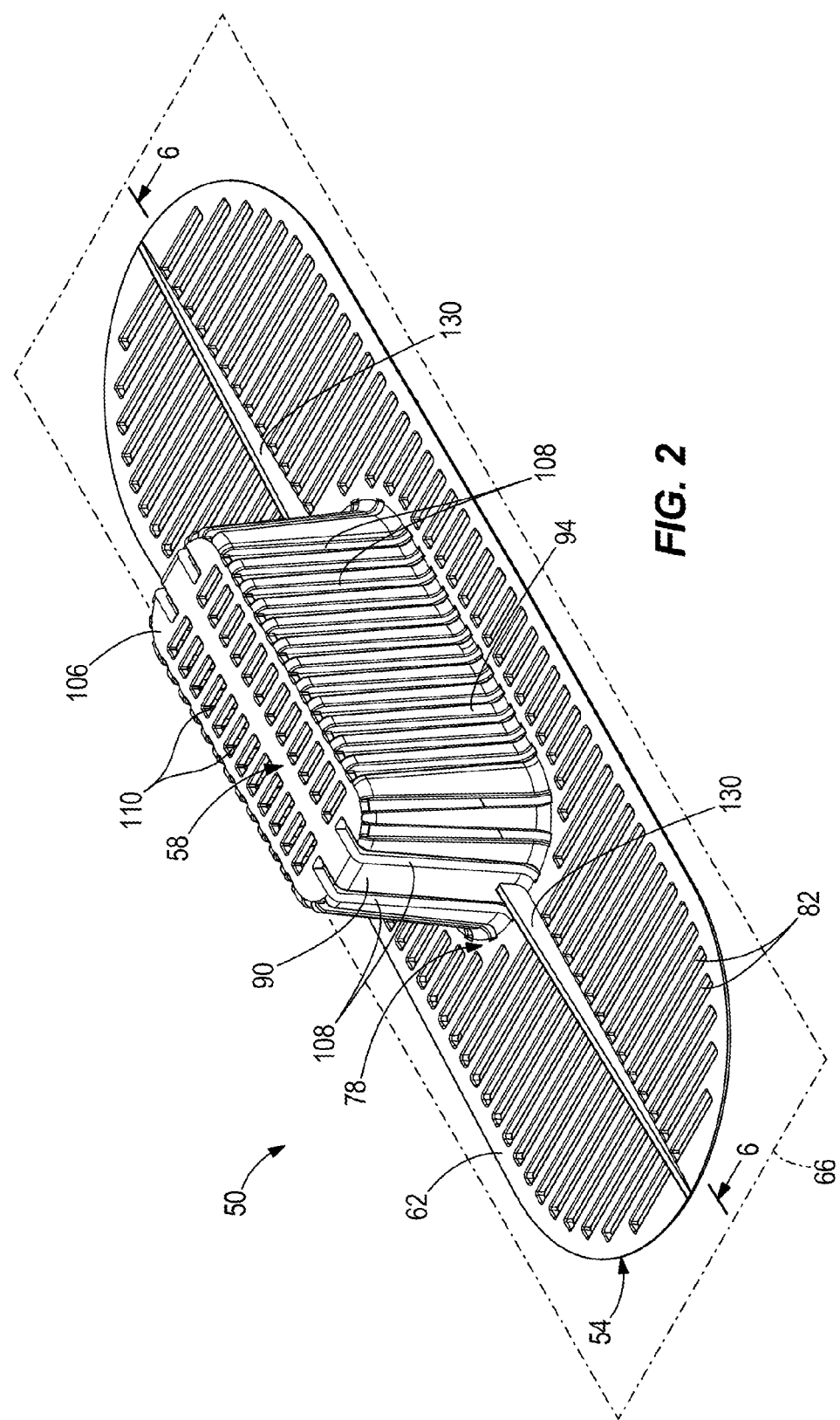
FIG. 2 is a top perspective view of a drain cover embodying the present invention for use in the refrigerated merchandiser.

With reference to FIGS. 2, 3, and 6, the base portion 54 includes openings or slots 82 that permit water and small debris to pass through the base portion 54 and into the gap 81. As illustrated in FIG. 2, each of the openings 82 in the base portion 54 is an elongate opening that extends linearly in a direction parallel to the plane 66.

With reference to FIGS. 2-6, the central portion 58 defines a pedestal or column that has a first wall 90, a second wall 94, a third wall 98, a fourth wall 102, and a fifth or top wall 106. The walls 90, 94, 98, 102 are contiguous and extend upward from the base portion 54 to define a cavity 104, and the fifth wall 106 caps the cavity 104. The walls 90, 92, 98, and 102 have perforations or slots or openings 108 (referred to as "openings" for purposes of description, and illustrated by way of example as elongated slots), and the wall 106 also has perforations or slots or openings 110 (referred to as "openings" for purposes of description). As illustrated, the openings 108 are defined by elongated apertures that extend parallel to each other in a direction upward from the base portion 54 to the fifth wall 106. The openings 110 are elongated apertures that extend horizontally (e.g., parallel to the plane 66). It will be appreciated that the openings 108, 110 can have other shapes and orientations. For example, the openings 108, 110 on one or more of the walls 90, 94, 98, 102, and 106 can be wider and/or larger in area than the openings 82 on the base portion 54 to allow water and other small debris to more easily pass through the central portion 58.

As illustrated in FIGS. 3-5, each of the walls 90, 94, 98, 102 is angled slightly inwardly relative to a vertical axis 111 extending through the central portion 58 such that the cavity 104 has a cross-sectional area proximate the base portion 54 (e.g., along the plane 66) that is larger than the cross-sectional area proximate the fifth wall 106 (e.g., along a plane 114 extending parallel to the fifth wall 106 and the plane 66—see FIG. 4). Other constructions of the cover 50 can include other shapes for the base portion 54 and the central portion 58.

With reference to FIGS. 3-6, the drain cover 50 also includes a rib 116 that extends downward along the axis 111 (see FIG. 5) from the fifth wall 106 extending through the plane 66. As illustrated in FIGS. 5 and 6, the rib 116 extends between the opposite walls 90, 98 to stiffen and provide structural rigidity to the drain cover 50. The rib 116 also divides the cavity 104 into two side-by-side chambers 118, 120. As illustrated, there is no fluid communication between the separate chambers 118, 120 through the rib 116.

Referring back to FIGS. 3-6, the rib 116 has a tongue or projection 122 that extends below the plane 66, as well as below a lowermost part of the base portion 54, to stabilize the cover 50 over the drain hole 126 in the base 22 (see FIG. 6). As illustrated in FIG. 6, the drain cover 50 is coupled to the base 22 over the drain hole 126. The projection 122 is centered on the rib 116 and has a width W1 that is smaller than the width of the rib 116 (measured from the base of the walls 90, 98), although the projection 122 can have the same width as the rib 116. Also, for example, the projection 122 can be sized and shaped to engage one or more walls 128 that define the drain hole 126. The projection 122 engages the drain hole 126 (e.g., the wall 128 in some constructions) to limit rotation or otherwise inhibit movement of the drain cover 50 relative to the drain hole 126.

With reference to FIGS. 2, 4, and 6, the cover 50 also includes two additional elongated ribs or stiffeners 130 that are disposed on the base portion 54 and that extend from the central portion 58 toward the outer rim 62 to provide stability to the cover 50. As illustrated, the ribs 130 are tapered such that a height (as viewed in FIGS. 4 and 6) of the ribs 130 decreases from the central portion 58 toward the outer rim 62.

The drain cover 50 provides drainage of water from the base 22 even when large debris is present in the water. More specifically, water can flow through the openings 82 in the base portion 54, along the gap 81, and into the drain hole 126 and, if the water level is relatively high, through the central portion 58 as well. The slotted base portion 54 and slotted central portion 58 limit the amount of debris that passes through the cover 50. In the event that debris accumulates and at least partially blocks the openings 82 in the base portion 54, water can continue to flow through the cover 50 via the openings 108, 110 in the central portion 58. Water entering the central portion 58 flows through the cavity 104 and into the drain hole 126. Stated another way, the central portion 58 and the cavity 104 provide relief for the drain cover 50 in the event that the openings 82 of the base portion 54 become at least partially clogged. The cavity 104 acts as an additional drain area for water and small debris that is otherwise unable to pass through the base portion 54. The projection 122 helps keep the drain cover 50 within the drain hole 126, limits rotation of the drain cover 50 relative to the base 22, and provides structural stability and support to the drain cover 50.

Various features and advantages of the invention are set forth in the following claims.

The invention claimed is:
1. A drain cover comprising:
a base portion including an outer rim and defining a collection area; and
a central portion including a wall extending upward from the base portion,
wherein the collection area continuously tapers from the wall toward the outer rim relative to a horizontal plane extending through opposite sides of the outer rim, and
wherein an upper surface of the collection area is vertically lower adjacent the central portion relative to an outer periphery of the collection area.
2. The drain cover of claim 1, wherein the base portion is elongated along a longitudinal axis that defines the horizon- tal plane, and wherein the base portion includes openings oriented across the longitudinal axis.

3. The drain cover of claim 1, wherein the base portion is elongated along a longitudinal axis defining the horizontal plane, and wherein the collection area is deeper adjacent the central portion than adjacent the outer rim.

4. The drain cover of claim 1, wherein the wall at least partially defines a column that has openings and that defines a cavity, and wherein the openings permit passage of water through the column into the cavity.

5. The drain cover of claim 4, wherein the openings are elongated in a vertical direction.

6. The drain cover of claim 4, wherein the central portion includes a top wall enclosing a top of the column.

7. The drain cover of claim 6, further comprising a rib disposed in the cavity and attached to one or both of the column and the top wall.

8. The drain cover of claim 7, wherein the rib divides the cavity into separate areas, and wherein there is no fluid communication between the separate areas through the rib.

9. The drain cover of claim 7, further comprising another rib extending between the central portion and the outer rim.

10. A drain cover comprising:
   a base portion defining a collection area; and
   a central portion coupled to the base portion and extending upward from the base portion, the central portion including a column having a top wall and a rib extending from the top wall and including a projection that extends below a lowermost part of the base portion, the projection configured to engage a drain hole to limit rotation of the drain cover relative to the drain hole,
   wherein the collection area is oriented to direct water and debris toward the central portion.

11. The drain cover of claim 10, wherein the base portion is elongated along a longitudinal axis that defines a horizontal plane, and wherein the base portion includes openings oriented across the longitudinal axis.

12. The drain cover of claim 10, wherein the base portion is elongated along a longitudinal axis that defines a horizontal plane, and wherein the collection area is deeper adjacent the central portion than adjacent the outer rim.

13. The drain cover of claim 10, wherein the central portion is defined by a column that has openings and that defines a cavity, and wherein the openings permit passage of water through the column into the cavity.

14. The drain cover of claim 13, wherein the openings are elongated in a vertical direction.

15. The drain cover of claim 10, further comprising a second rib extending from the central portion to an outer rim of the base.

16. A merchandiser comprising:
   a base supporting a product display area and including a drain hole;
   a drain cover coupled to the base over the drain hole and including a raised central portion and a base portion, the drain cover defining a collection area adjacent the central portion,
   wherein the drain cover is spaced from a surface of the base by a spacer such that water can flow from the collection area through the drain cover and along the surface toward the drain hole.

17. The merchandiser of claim 16, wherein the spacer is disposed on a lower surface of the base portion and in contact with a surface of the base to separate the base portion from the surface of the base.

18. The merchandiser of claim 17, wherein the base portion includes an outer rim and is elongated along a horizontal plane that extends through opposite sides of the outer rim, and wherein the lower surface of the base portion and the surface of the base extend at a downward angle relative to the horizontal plane.

19. The merchandiser of claim 16, wherein the drain cover further includes a projection extending into the drain hole to limit rotation of the drain cover relative to the drain hole.

* * * * *